United States Patent [19]

Delsalle et al.

[11] Patent Number: 5,730,864
[45] Date of Patent: Mar. 24, 1998

[54] INSTALLATION FOR TREATING AN UNTREATED FLOW BY SIMPLE SEDIMENTATION AFTER BALLASTING WITH FINE SAND

[76] Inventors: Françoise Delsalle, 10, Avenue Dubonnet, 92400 Courbevoie, France; Nicholas Le Poder, 4, résidence Parc du Château, 78430 Louveciennes, France; Patrick Binot, 18, rue de Champagne - Rentilly, 77600 Bussy St.Georges, France

[21] Appl. No.: 431,833

[22] Filed: May 1, 1995

[30] Foreign Application Priority Data

May 2, 1994 [FR] France ................. 94-05308

[51] Int. Cl.$^6$ ............... C08F 1/52; B01D 21/08
[52] U.S. Cl. ............ 210/195.1; 210/202; 210/208; 210/256
[58] Field of Search ............ 210/195.1, 205–210, 210/219, 256

[56] References Cited

U.S. PATENT DOCUMENTS

| | | | |
|---|---|---|---|
| 4,139,456 | 2/1979 | Yabuuchi et al | 210/7 |
| 4,290,898 | 9/1981 | Hagel et al | 210/738 |
| 4,320,012 | 3/1982 | Palm et al. | 210/713 |
| 4,388,195 | 6/1983 | Hagel et al | 210/713 |
| 4,465,597 | 8/1984 | Herman et al. | 210/713 |
| 4,579,655 | 4/1986 | Louboutin et al | 210/195.3 |
| 5,112,499 | 5/1992 | Murray et al. | 210/713 |

FOREIGN PATENT DOCUMENTS

| | | |
|---|---|---|
| 385498 | 11/1988 | Austria . |
| 0330582 | 8/1989 | European Pat. Off. . |
| 1411792 | 12/1965 | France . |
| 1501912 | 10/1967 | France . |
| 2071027 | 10/1971 | France . |

OTHER PUBLICATIONS

"Study of weighted flocculation in view of a new type of clarifier", J Water SRT–Aqua, vol. 41, No. 1, pp. 18–27, 1992.

"Interet De La Floculation Lestee. Elaboration D'un Nouveau Procede De Clarification: L'actiflo$^R$", Journees Information Eaux, 26–28 Septembre 1990, with partial translation.

Brochures, OTV "The Cyclofloc$^R$ Flocculator–Settler"; Actiflo$^R$ Process –Sewage Water–Storm Water; and Actiflo$^R$ Process –Drinking Water.

Letter to Institut National de la Propriete Industrielle, 22 January 1986.

Letter to Institut National de la Propriete Industrielle, 25 April 1986.

Primary Examiner—Thomas G. Wyse

[57] ABSTRACT

In a method of treating an untreated flow of liquid charged with particles and/or colloids, the flow is caused to flow in a coagulation zone that is kept turbulent and in which the flow is mixed with a coagulant. The untreated flow and a granular material which is insoluble in and more dense than the flow are caused to flow in an intermediate zone in which the granular material is maintained in suspension. The flow with substantially all of the added granular material and the colloids or particles aggregated therein is caused to flow in a sedimentation zone in which a clarified effluent is separated from sludge consisting of the granular material and the aggregated particles or colloids. The sedimentation zone has an undivided flow cross section with no separator plates and the effluent is caused to flow therein at an average settling speed of at least 15 m/h.

12 Claims, 2 Drawing Sheets

INSTALLATION FOR TREATING AN UNTREATED FLOW BY SIMPLE SEDIMENTATION AFTER BALLASTING WITH FINE SAND

BACKGROUND OF THE INVENTION

1. Field of the Invention

The present invention concerns a method of and an installation for separating solids and liquids (in particular, but not exclusively, for clarifying or purifying effluent) by coagulation—flocculation—sedimentation without separator plates (i.e. simple sedimentation).

2. Description of the Prior Art

This invention is in the tradition of techniques for treating effluent by physical-chemical treatment (with formation of floc) followed by sedimentation (referred to as physical-chemical sedimentation for short).

The first simple physical-chemical sedimentation devices allowed operation at a "mirror" rate (i.e. the flowrate treated in $m^3/h$ per unit surface area of the sedimentation device in $m^2$) in the order of one meter per hour; this upper limit was imposed by the lightness of the physical-chemical floc and the low settling speed of the floc in effluent.

French Patent 1,411,792 discloses a major improvement consisting in the simultaneous addition to the effluent to be treated of auxiliary solid clarification agents (for example fine sand with a particle size from 20 μm to 200 μm), a polymer and optionally other chemical products routinely used in purification of effluent (flocculation agents).

The floc that forms traps grains of sand which increase its density and therefore its settling speed; the effluent charged with floc flows into a sedimentation reactor from which it overflows (whence a decreasing field of speed from the entry at the bottom to the exit at the top); settling speeds in the order of 6 m/h to 8 m/h are routinely achieved in installations using this principle (these installations are usually called "CYCLOFLOC" installations).

The sand is recovered, for example by hydrocycloning of the sandy sludge, and recycled to the entry of the installation.

French Patents 2,553,082 and 2,071,027 describe a technique in which contact between the untreated effluent and the granular material is brought about by upward flow of the untreated effluent through a fluidized bed of the granular material (sand, in practice), with an upward speed that decreases continuously, and with the concentration regulated with the aid of a sample taken in the fluidized bed of a purge of sand laden with sludge which is recycled after separating the sludge. Separator plates are provided to improve sedimentation above the fluidized bed.

The benefits of using inclined separator plates for treatment of effluent is discussed in many documents including U.S. Pat. Nos. 4,142,970, 4,290,898 and 4,388,195.

"FLUORAPID" sedimentation units using the above principle can achieve mirror speeds up to 8 m/h to 15 m/h.

Another sedimentation method is described in French Patent 2,552,082; this method does not use sand; instead a thickening and sedimentation intermediate chamber is provided between a reaction chamber (flocculation and/or precipitation) and a sedimentation chamber with separator plates. The reaction chamber has two chambers in communication at their top and bottom ends and an axial flow screw causing a strong flow between the two chambers. The reaction chamber also receives some of the sludge recovered from the bottom of the intermediate chamber.

The effluent charged with floc overflows into the upper part of the intermediate chamber in which the floc is thickened and in which 85% to 90% of the floc is deposited on the bottom of the chamber. The partially clarified effluent then enters a sedimentation chamber with separator plates for further sedimentation. It seems that speeds in the order of 35 m/h can be obtained in this way if the constraints in terms of treated effluent quality are moderate.

A more recent proposal is a treatment method also directed to increasing the sedimentation outlet speed without compromising the quality of the treated effluent and is described in U.S. Pat. No. 4,927,543; this method is implemented using installations usually called "ACTIFLO" installations.

In this method the effluent is injected into a stirred chamber for mixing and destabilizing the colloids into which the granular material (fine sand, in practice) and the reagents are also fed. The mixture of effluent, sand, reagent and floc being formed is then passed into a stirred intermediate aggregation chamber in which the floc that began to form in the mixing chamber increases in size without settling. The mixture of effluent and aggregated floc is then fed into a sedimentation chamber with separator plates. The mixture of sand and sludge recovered from the bottom of the sedimentation chamber with separator plates is hydrocycloned and the sand is recycled to the mixing chamber.

This method produces effluent of excellent quality with mirror settling speeds up to around 100 meters per hour.

It is clear that the successive advances resulting from the techniques mentioned above consist, for a given quality of treated effluent, in an increase in the settling speed, firstly using ballasted floc (CYCLOFLOC), then by combining the use of sedimentation using separator plates with floc ballasted with sand (FLUORAPID) or sludge that has previously settled, and finally by improving the quality of preparation of the floc through use of specific stirring conditions, again in combination with sedimentation using separator plates (ACTIFLO).

Thus all the recent methods described in the literature, including the ACTIFLO method, are based on the use of separator plates for sedimentation wherever mirror settling speeds in excess of 15 m/h, for example, are required.

These separator plates represent a non-negligible element of the cost of the installation, both through their inherent cost and through the resulting installation and cleaning constraints.

The present invention is therefore directed to improving the overall economy of sedimentation by eliminating the separator plates without compromising the quality of the treated effluent.

In a manner that the person skilled in the art will find surprising and unexpected, we have discovered that careful physical-chemical preparation of the floc around a granular ballasting material of the type proposed in U.S. Pat. No. 4,927,543 can yield high settling speeds despite the absence of separator plates and therefore use a process that is more economical and simpler than existing processes.

As explained below, the floc formed by the method of the invention yields mirror speeds of as much as several tens of meters per hour, which is very much greater than the speeds of at most around ten meters per hour obtained with flocs produced using the CYCLOFLOC method, combined with treated effluent of very high quality.

SUMMARY OF THE INVENTION

The invention proposes a method of treating an untreated flow of liquid charged with particles and/or colloids wherein:

the untreated flow is caused to flow in a first or coagulation zone that is kept turbulent and in which the flow is mixed in controlled proportions with a coagulant reagent, the coagulated flow and a granular material added in controlled proportions and which is insoluble in and more dense than the flow are caused to flow in a second or intermediate zone in which turbulence is maintained in order to maintain the granular material in suspension while colloids or particles in the flow aggregate around particles of the granular material;

the flow with substantially all of the added granular material and the colloids or particles aggregated therein is caused to flow in a third or sedimentation zone in which a clarified effluent is separated from sludge consisting of the granular material and the aggregated colloids; and the sludge is collected, the granular material is extracted from it to recycle it and the sludge is extracted without granular material;

wherein the sedimentation zone in which the clarified effluent and the sludge are separated has an undivided flow cross-section and the flow laden with granular material and with aggregated material is caused to flow therein at an average settling speed of at least 15 m/h.

The untreated flow is preferably effluent to be treated.

Thus the granular material is added in the intermediate zone at the latest. It can be fed into the coagulation zone; it can be fed in at more than one location (the coagulation zone and the intermediate zone).

The mean speed (mirror speed) concept mentioned above arises out of the fact that the flow of effluent to be treated fluctuates in practice.

In other words, sedimentation is effected freely without closely spaced subdividing mechanical members such as separator plates in the path of the flow. Distribution members such as partitions or troughs can of course be provided for reasons of hydraulic control, dependent on the geometry of the sedimentation zone.

In accordance with preferred features of the invention, some of which may be combined with others:

the granular material is fine sand;

the mean particle size of the sand is between approximately 20 µm and approximately 300 µm, preferably between 80 µm and 200 µm;

the settling speed is at least 35 m/h;

the speed gradient in the intermediate zone is between 70 $s^{-1}$ and 450 $s^{-1}$, preferably between 150 $s^{-1}$ and 250 $s^{-1}$;

a flocculant agent is fed into the untreated flow in a first part of the intermediate zone or flocculation zone which is kept turbulent, the remainder of the intermediate zone constituting a maturation zone in which aggregation of the particles and colloids is completed;

further flocculant agent is fed into the maturation zone;

at least some of the granular material is fed into the flocculation zone;

the flocculation zone is stirred with a speed gradient between approximately 100 $s^{-1}$ and approximately 450 $s^{-1}$, preferably between 200 $s^{-1}$ and 250 $s^{-1}$, and more preferably in the order of approximately 200 $s^{-1}$;

the speed gradient in the maturation zone is less than the speed gradient in the flocculation zone;

the speed gradient in the maturation zone is between 70 $s^{-1}$ and 300 $s^{-1}$, preferably between 150 $s^{-1}$ and 200 $s^{-1}$, and more preferably in the order of approximately 150 $s^{-1}$ to 200 $s^{-1}$;

a cyclone or vortex is generated in the sedimentation zone by feeding the flow from the second zone from a predetermined side of a vertical axis of symmetry of the sedimentation zone; and the granular material is separated from the sludge by hydrocycloning, screening or centrifuging.

The speed gradient G ($s^{-1}$) is expressed by the formula:

$$G=(P/\mu \cdot V)^{1/2}$$

where

P=power dissipated in the liquid (Watts),

B=viscosity of the liquid (Pa.s), and

V=volume of the liquid ($m^3$).

The existence of minima and maxima thresholds for the speed gradient values stated above is explained by the fact that the granular material must be kept in suspension, contact between small floc being formed with floc already formed around particles of granular material must occur at high relative speeds and shear stresses must be reduced to levels which do not cause any significant deterioration of the floc that is formed.

The invention also proposes an installation for treating an untreated flow of liquid, including in series:

a first coagulation zone having a main entry channel connected to a source of untreated flow and a secondary channel connected to a source of coagulant reagent, stirrer means in the coagulation zone, a second or intermediate zone communicating with the first zone;

second stirrer means in the intermediate zone;

a secondary channel connected to a source of granular material that is insoluble in and more dense than the untreated flow, discharging into the coagulation zone or into the intermediate zone, a third or sedimentation zone communicating with the second zone and having in its upper part an outlet channel for clarified effluent and in its lower part a sludge removal channel; and a separation zone adapted to recover the granular material in the sludge and having an outlet channel connected to the source of granular material;

wherein the sedimentation zone has an undivided flow crosssection and dimensions, given a predetermined inlet flowrate value, such that the average mirror speed therein is at least 15 m/h.

The coagulation zone is in practice a tank but it must be understood that this zone can instead be formed by a portion of pipe into which the coagulant reagent is injected, the stirring required for coagulation possibly being generated by a bend in the pipe, a drop, a static mixer or any other device enabling the coagulant reagent to be brought quickly into contact with the entire flow.

In accordance with preferred features of the installation of the invention, some of which may be combinable with others:

the sedimentation zone has dimensions such that the mirror speed therein is at least 35 m/h;

the stirrer means of the intermediate zone are connected to means adapted to generate by means of the stirrer means speed gradients between 70 $s^{-1}$ and 450 $s^{-1}$, preferably between 150 $s^{-1}$ and 250 $s^{-1}$;

the intermediate zone includes a flocculation zone into which a coagulated flow inlet channel and an inlet secondary channel connected to a source of flocculant agent discharge, followed by a maturation zone;

the maturation zone includes a flocculant agent inlet second channel;

the secondary inlet channel connected to the source of granular material discharges into the flocculation zone;

the second stirrer means in the intermediate zone are connected to means adapted to generate by means of the second stirrer means speed gradients in the flocculation zone between approximately 100 s$^{-1}$ and approximately 450 s$^{-1}$, preferably between 200 s$^{-1}$ and 250 s$^{-1}$, and speed gradients in the maturation zone between approximately 70 s$^{-1}$ and approximately 300 s$^{-1}$, preferably between 150 s$^{-1}$ and 200 s$^{-1}$;

the sedimentation zone is a circular crosssection chamber the maturation zone is a chamber at the center of the sedimentation zone;

the maturation zone:
i) is connected at its entry end to a downwardly extending tube;
ii) contains a wall in front of the outlet of the tube and adapted to be crossed by underflow; and
iii) is surrounded by an upwardly projecting tubular wall, the outlet channel for clarified effluent extending from the upper zone of the sedimentation zone to the exterior of the tubular wall;

the maturation zone communicates with the sedimentation zone via a tube discharging into the sedimentation zone away from a vertical axis of symmetry of the latter, so as to generate a cyclone or vortex;

the sedimentation zone is circular and the tube discharges therein tangentially;

the sedimentation zone has in a central position a tubular wall communicating with a clarified effluent removal trough, the tubular wall can have no bottom and can be bordered in its upper part by a gutter communicating with the trough; the wall can also have a bottom and communicate directly with the removal trough, for example via the bottom.

One installation constructed according to this principle has been operated with mirror settling speeds in the order of 50 m/h and possibly up to 100 m/h and above.

There was previously nothing to suggest the possibility of obtaining such settling speeds without using a sedimentation plant including separator plates.

To the contrary, using Stokes formula to evaluate the settling speed of spherical particles of sand (density 2.65 T/m$^3$) in effluent gives speeds in the order of 30 m/h for particles 100 μm in diameter or 8 m/h for particles 50 μm in diameter.

As already emphasized above, obtaining high settling speeds (say greater than 15 m/h) has systematically been attempted until now by combining the use of separator plates with a particular way of preparing the floc.

It is nevertheless apparent that careful preparation of the floc around the granular material has a synergistic action when combined with the inherent settling speed of the pure granular material, and that the increase in diameter resulting from flocculation has a positive effect on the settling speed which, by virtue of the compactness of the floc resulting from its particular mode of preparation, is greater than the negative action of the reduction in the density of the floc compared to that of the pure granular material.

Objects, features and advantages of the invention will emerge from the following description given by way of non-limiting example with reference to the appended drawings.

DETAILED DESCRIPTION OF THE PREFERRED EMBODIMENT

Figure 1:
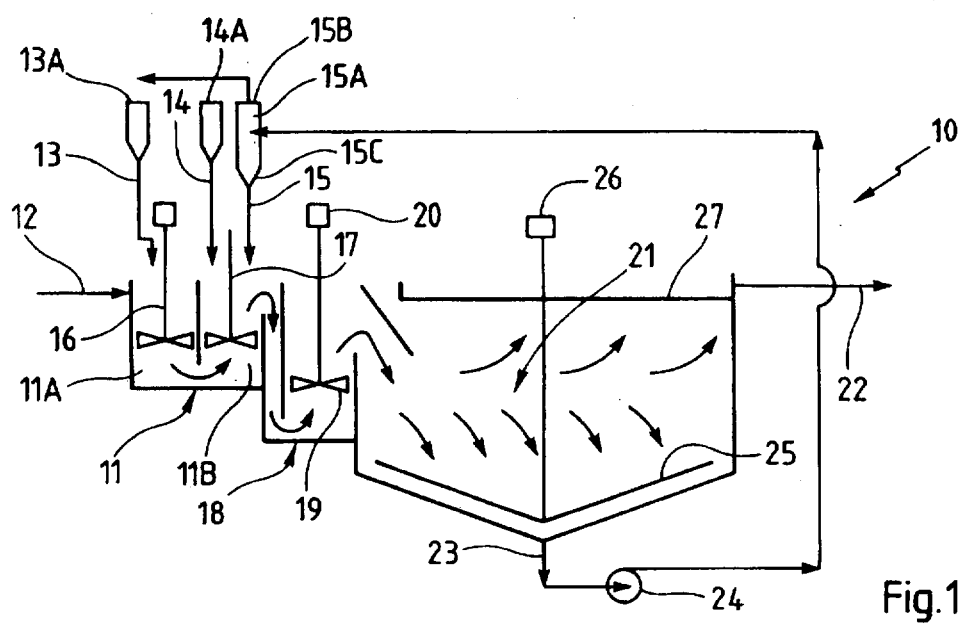
FIG. 1 is a diagrammatic elevational view of a first effluent treatment installation of the invention.

FIG. 1 is a diagrammatic representation of a effluent treatment installation 10 embodying in series:

a first chamber or coagulation zone 11A having a main inlet channel 12 connected to a source of effluent to be treated and a secondary channel 13 connected to a source of coagulant reagent 13A;

at least one stirrer member 16 in this coagulation zone;

a second or intermediate zone communicating with the first zone, here by means of an underflow (in an alternative embodiment, not shown, this communication could of course be by means of an overflow), and connected by respective secondary channels 14 and 15 to a source 14A of flocculant agent and to a source 15A of a granular material that is insoluble in effluent and is more dense than effluent;

at least second stirrer means in this intermediate zone, connected to means adapted to generate in all of this zone speed gradients in the order of at least approximately 70 s$^{-1}$ to approximately 450 s$^{-1}$, preferably in the order of approximately 150 s$^{-1}$ to approximately 250 s$^{-1}$;

a third or sedimentation zone 21 communicating with the second zone (here by means of an overflow) and having in its upper part an outlet channel 22 for clarified effluent and in its lower part a sludge removal channel 23, here provided with a pumping unit 24;

a separation zone constituting here the source 15A of granular material, adapted to recover the granular material in the sludge and having a sludge outlet channel 15B and a granular material outlet channel 15C. Separation can be obtained by any appropriate known means available to the person skilled in the art for separating the recycled sand from the sludge, including hydrocycloning, screening and centrifuging.

In this example the sedimentation zone or chamber has a circular cross section (it can be any other shape, with hoppers at the bottom for removing the sludge) and advantageously has a scraper 25 running along the conical bottom of this zone and rotated by a motor 26, usually at a low speed so that in practice its peripheral speed is less than or equal to about 10 cm/s.

A trough 27 for recovering clarified effluent is provided in the upper part of the sedimentation chamber.

In accordance with the invention the sedimentation zone has an undivided flow cross section, i.e. it does not feature any mechanical members dividing the flow on approaching the clarified effluent outlet channel. Thus there are no separator plates in the sedimentation zone. Distribution members such as partitions or troughs can of course be provided for reasons of hydraulic control, depending on the geometry of the sedimentation zone.

However, the sedimentation chamber is dimensioned to suit a nominal flowrate Q of effluent to be treated such that the "mirror speed" Vm in this chamber is at least 15 m/h, and preferably at least 35 m/h.

In other words, the sedimentation chamber has a horizontal cross section S such that:

$$Q/S > 15 \text{ m/h}$$

The coagulant is of any appropriate known type (for example ferric chloride or aluminum sulfate).

The intermediate zone is formed in this example by two chambers in series: a flocculation chamber 11B into which the second flocculant agent entry channel 14 and the granular material entry secondary channel 15 discharge and a maturation zone 18.

In an alternative embodiment, not shown, the maturation zone includes a secondary channel connected to the source 14A for further addition of flocculant agent.

The flocculant agent is of any appropriate known type (for example the anionic and/or cationic polyelectrolyte type).

In an alternative embodiment, not shown, the granular material entry secondary channel 15 discharges into the first chamber 11A, or even into the discharge and maturation chamber 18, or even into more than one of the chambers 11A, 11B and 18. It is preferable for the granular material to be fed into the first chamber 11A and/or into the flocculation chamber 11B.

In this example the chambers 11A and 11B are of similar size, within a battery 11.

Each of the flocculation chamber 11B and the discharge and maturation 18 has a stirrer, the speed gradient being in principle maximum in the flocculation zone. The flocculation chamber 11B has a stirrer 17 driven by a motor, not shown, at a speed adapted to generate a speed gradient between 100 s$^{-1}$ and 450 s$^{-1}$ preferably between 200 s$^{-1}$ and 250 s$^{-1}$, and the discharge and maturation chamber 18 includes a stirrer 19 driven by a motor 20 at a speed adapted to generate a speed gradient between 70 s$^{-1}$ and 300 s$^{-1}$, preferably between 150 s$^{-1}$ and 200 s$^{-1}$.

The granular material is preferably sand (easy to obtain at low cost) with a mean particle size between about 20 μm and 300 μm, preferably between 80 μm and 200 μm.

Figure 3:
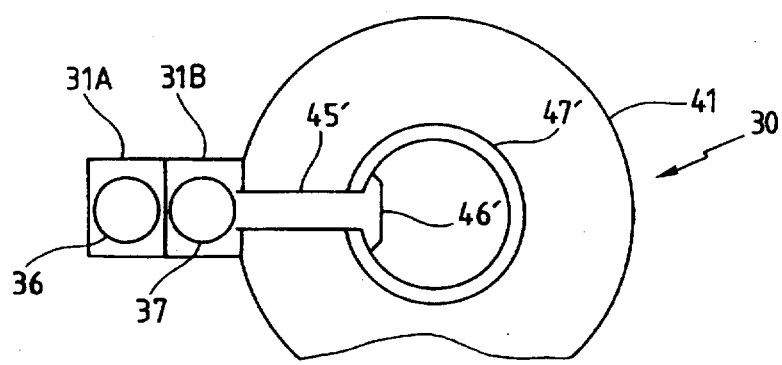
FIG. 3 is a diagrammatic plan view of part of the second installation.
Figure 2:
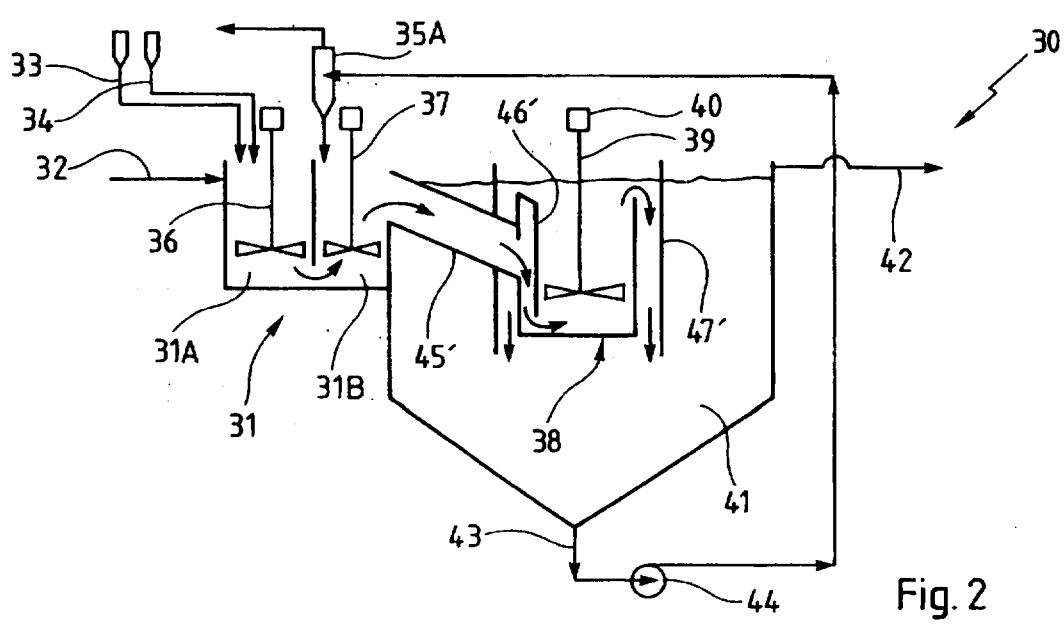
FIG. 2 is a diagrammatic elevational view of a second effluent treatment installation of the invention.

FIGS. 2 and 3 show a different embodiment of the invention. They show an installation 30 in which elements analogous to those of FIG. 1 have the same reference numbers increased by 20.

The main difference compared to FIG. 1 is that, although the coagulation and flocculation zones are outside the zone 41, as previously, the sedimentation maturation zone 38 is at the center of the sedimentation zone 41, communicating with the flocculation zone 31B via a downwardly extending tube (or trough) 45'; a partition 46' facing the outlet from this tube is adapted to cause downward flow of the fluid mass as far as the bottom of the maturation chamber 38.

The fluid mass leaves the intermediate chamber via an overflow.

To prevent any of the fluid mass from escaping directly to the outlet channel 42 a tubular partition 47' is provided around the intermediate chamber, its upper edge being higher than the normal level of the fluid mass in the sedimentation chamber.

Because of the steep inclination (typically exceeding 55°) of the bottom, the conical bottom of the sedimentation chamber has no scraper in this embodiment.

Compared to that of FIG. 1, the configuration of FIGS. 2 and 3 has the advantage of being more compact when added to an existing installation and of enabling better distribution in the sedimentation zone.

Figure 5:
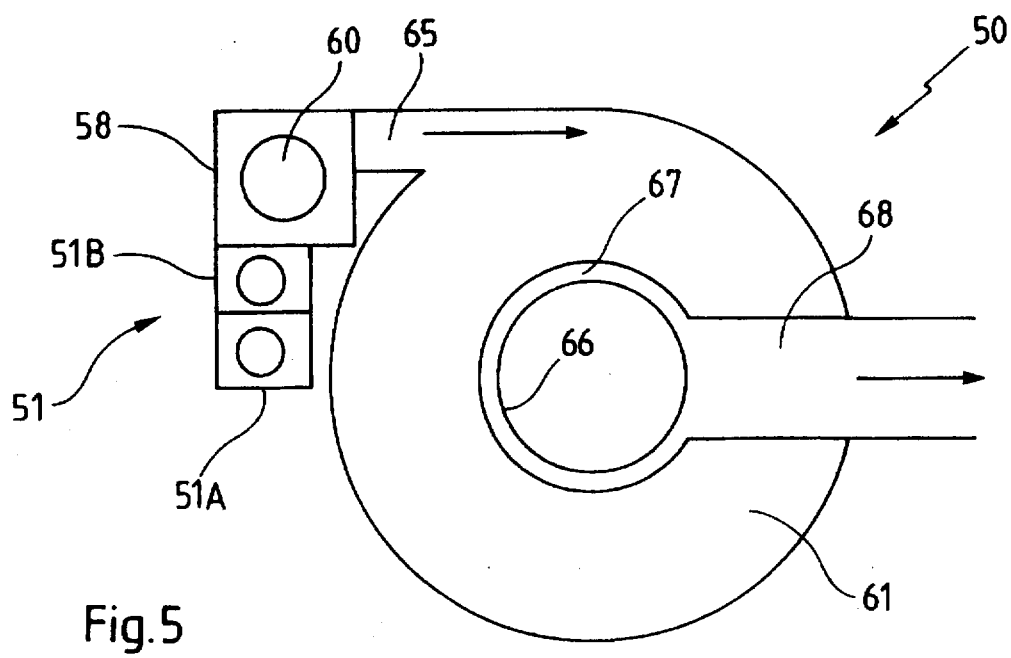
FIG. 5 is a diagrammatic plan view of the third installation.
Figure 4:
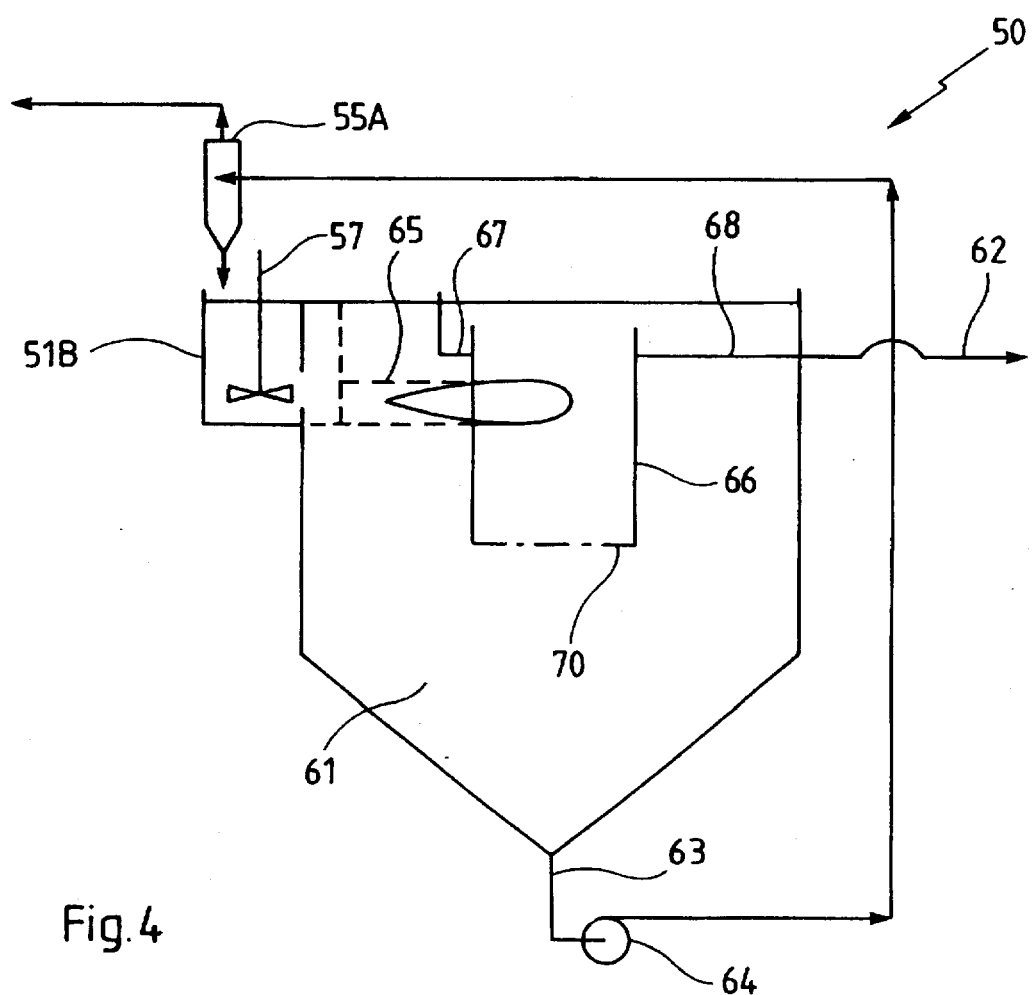
FIG. 4 is a diagrammatic elevational view of a third effluent treatment installation of the invention.

FIGS. 4 and 5 show another embodiment of the invention. They show an installation 50 in which elements analogous to those of FIG. 1 have the same reference numbers increased by 40.

The main difference compared to FIG. 1 is that the outlet from the maturation chamber 58 is a tube 65 which discharges laterally into the sedimentation chamber 61, away from and transversely to its vertical axis of symmetry. To be more precise, the tube 65 advantageously discharges tangentially to the lateral wall of the sedimentation chamber 61, producing a cyclone or vortex which helps to accelerate sedimentation.

At the center of the chamber is a bottomless tubular wall 66 over the top of which overflows clarified effluent which is collected by an annular gutter 67 connected to a take-off trough 68. As an alternative, the tubular wall 66 can have a bottom (as symbolized by the chain-dotted line 70) hydraulically isolating the interior of this wall from the remainder of the sedimentation unit, and the clarified effluent overflows this wall before it is removed via the trough 62 which in this example runs direct from the inside of this wall.

The presence of two successive chambers in the intermediate zone of FIGS. 1 through 5 is explained by the fact that in the case of effluent charged with colloidal organic material it has been found that a preferred method of forming the floc to obtain settled effluent of better quality is to feed the coagulant agent intended to destabilize the colloidal solution (usually a high valency metal salt or a cationic polymer) at the start of the preparation process, mixed with the untreated effluent by stirring or by static mixing. After this first destabilizing mixing the flocculant polyelectrolyte is injected into the stirred flocculation zone with a relatively high speed gradient (between 100 s$^{-1}$ and 450 s$^{-1}$, preferably around 200 s$^{-1}$), enabling the microfloc resulting from coagulation to gather and to trap particles of granular material held in suspension.

Finally, the mixture of effluent and floc is fed into the maturation chamber, stirred with a speed gradient of approximately 70 s$^{-1}$ to approximately 300 s$^{-1}$, preferably in the order of approximately 150 s$^{-1}$. In the maturation chamber the floc aggregates to an optimum size between about 0.5 mm and about 2.5 mm, depending on the quality of the incoming effluent. The time it remains in the coagulation zone can be very short, depending mainly on the quality of the mixing that takes place in this zone (this time is usually between a few seconds and three minutes or even more (up to 10 minutes), preferably from 30 seconds to 1.5 minutes at the peak flowrate).

The time in the flocculation zone is advantageously between 0.5 minutes and four minutes, or even more (up to 10 minutes), preferably 1.5 minutes to two minutes at the peak flowrate); the time spent in the maturation zone is between two minutes and eight minutes, or even more, up to 18 minutes (preferably three minutes to six minutes at the peak flowrate to be treated).

It will be understood that dispensing with separator plates in the sedimentation zone eliminates the installation constraints associated with the separator plates. For example, a round shape can be chosen for the sedimentation chambers.

The invention combines preparation in a series of at least two chambers (flocculation and maturation, if the coagulation is carried out in-line beforehand), and preferably in three chambers (coagulation, flocculation, maturation as in the above examples), the tanks being rectangular or cylindrical, with simple sedimentation in a rectangular or cylindrical tank, depending on installation or civil engineering constraints.

The embodiment without separator plates of FIGS. 4 and 5 combines physical-chemical preparation of the ballasted floc described above with enhanced sedimentation in a cyclone or vortex type sedimentation unit.

This type of sedimentation unit has been tested in natural sedimentation and, without using separator plates, increases the mirror speeds that can be achieved: its use in combination with careful physical-chemical preparation of a dense ballasted floc as described above improves sedimentation performance compared to simple sedimentation.

A pilot installation has been constructed with the following parameters:

flocculation tank: 4 m³ with vigorous stirring (~50 W/m³, i.e. a speed gradient of around 220 s⁻¹) into which ferric chloride is fed, injection tank: 4 m³, also with strong stirring (~50 W/m³, i.e. a speed gradient of around 220 s⁻¹) into which an anionic polymer and sand with a grain diameter of 130 μm from the underflow of a hydrocyclone separating the extracted sludge from the recirculating sand are fed;

maturation tank: 15 m³ stirred more slowly (~35 W/m³, i.e. a speed gradient of around 190 s⁻¹);

sedimentation tank: rectangular cross section 1.94 m×1.1 m=2.1 m² (mirror surface), height 1.5 m, front fed at the bottom and equipped with a pyramid-shape hopper with flushed sludge and sand removal;

treated effluent recovered from a central trough 0.5 m wide.

The table below summarizes the results of two tests:

|  | TEST 1 | TEST 2 |
| --- | --- | --- |
| Flowrate | 100 m³/h | 200 m³/h |
| Ferric chloride | 60 mg/l (pure product) | 60 mg/l (pure product) |
| Coagulation time | 2.6 minutes | 1.3 minutes |
| Polymer | 0.9 mg/l | 0.9 mg/l |
| Sand | 8 kg/m³ | 4.6 kg/m³ |
| Feed time | 2.6 minutes | 1.3 minutes |
| Maturation time | 9 minutes | 4.5 minutes |
| Mirror speed | 45 m/h | 90 m/h |
| Sludge removal rate | 10% | 5% |
| Inlet MIS | 255 mg/l | 114 mg/l |
| Outlet MIS | 31 mg/l | 30 mg/l |
| Yield | 87.8% | 73.7%% |

Compared to test 1, test 2 represents a "high" flowrate and a "low" concentration of materials in suspension (MIS).

The table shows the excellent efficiency in reducing MIS with high mirror speeds (45 m/h and 90 m/h).

It goes without saying that the foregoing description has been given by way of non-limiting example only and that numerous variants can be put forward by the person skilled in the art without departing from the scope of the invention. For example, the invention can be generalized to the treatment of any other liquid charged with particles or colloids, for example baths for surface treatment of metals in the iron and steel industry.

There is claimed:

1. A system for clarifying an influent liquid through a sedimentation process comprising:
   a) a coagulation zone for mixing a coagulation reagent with the influent liquid;
   b) an intermediate zone disposed downstream of the coagulation zone for receiving mixed liquid from said coagulation zone and mixing therein an insoluble granular material having a density greater than the liquid so as to promote flocculation, said granular material being added at least as early as the intermediate zone;
   c) a sedimentation tank, having a wall structure, disposed downstream of the intermediate zone and communicatively connected to said intermediate zone for receiving mixed liquid therefrom, said sedimentation tank including an effluent outlet formed in an upper portion thereof for directing clarified effluent from the sedimentation tank;
   d) a separation zone for receiving combined granular material and sludge from said sedimentation tank and for separating the granular material from the sludge such that the granular material can be recycled through the system;
   e) a flow directing baffle, having a lower terminal edge, interposed between said intermediate zone and said effluent outlet, said baffle defining a downflow zone between said intermediate zone and said baffle and an upflow zone on the side of the baffle opposite said downflow zone; and
   f) wherein the baffle is particularly spaced relative to the adjacent sedimentation tank wall structure so as to permit unrestricted flow from the downflow zone to the upflow zone.

2. The system of claim 1 wherein at least a portion of the intermediate zone is disposed centrally within the sedimentation tank and includes a chamber having a surrounding wall structure and wherein the flow directing baffle is disposed in general parallel relationship to the outer wall structure of the chamber.

3. The system of claim 1 wherein the sedimentation tank is formed without separator plates and maintains an average mirror rate of at least 15 m/h while producing clarified effluent having at least a 60% reduction in materials in suspension relative to the influent.

4. The system of claim 1 wherein the sedimentation tank maintains an average mirror rate of at least 35 m/h while producing clarified effluent having at least a 65% reduction in materials in suspension relative to the influent.

5. The system of claim 1 wherein the sedimentation tank maintains an average mirror rate of at least 90 m/h while producing clarified effluent having at least a 70% reduction in materials in suspension relative to the influent.

6. system of claim 3 wherein the intermediate zone includes a stirrer for producing speed gradients in the intermediate zone in the range of 70 s⁻¹ to 450 s⁻¹.

7. The system of claim 3 wherein the intermediate zone includes a stirrer for producing speed gradients in the intermediate zone in the range of 450 s⁻¹ to 250 s⁻¹.

8. The system of claim 3 wherein the sedimentation zone comprises a circular cross-section chamber.

9. The system of claim 3 wherein the intermediate zone includes two separate chambers, a flocculation chamber having an inlet for a flocculation agent and a maturization chamber disposed downstream from the flocculation chamber.

10. The system of claim 9 wherein the flocculation chamber includes an inlet for directing the granular material into the flocculation chamber.

11. The system of claim 9 wherein the flocculation chamber includes a stirrer that generates speed gradients within the flocculation chamber in the range of 100 s⁻¹ to 450 s⁻¹; and wherein the maturization chamber includes a stirrer that generates speed gradients in the range of 70 s⁻¹ to 300 s⁻¹.

12. The system of claim 9 wherein the maturization chamber is disposed generally in the center of the sedimentation tank.

* * * * *

(12) EX PARTE REEXAMINATION CERTIFICATE (5080th)
United States Patent
Delsalle et al.

(10) Number: US 5,730,864 C1
(45) Certificate Issued: Mar. 8, 2005

(54) INSTALLATION FOR TREATING AN UNTREATED FLOW BY SIMPLE SEDIMENTATION AFTER BALLASTING WITH FINE SAND

(75) Inventors: Françoise Delsalle, Courbevoie (FR); Nicholas Le Poder, Louveciennes (FR); Patrick Binot, Bussy St. Georges (FR)

(73) Assignee: Omnium de Triatement et de Valorisation (OTV), Saint-Maurice Cedex (FR)

Reexamination Request:
No. 90/006,738, Aug. 11, 2003

Reexamination Certificate for:
Patent No.: 5,730,864
Issued: Mar. 24, 1998
Appl. No.: 08/431,833
Filed: May 1, 1995

(30) Foreign Application Priority Data

May 2, 1994 (FR) .............................. 94-05308

(51) Int. Cl.⁷ .............................. C02F 1/52; B01D 21/08

(52) U.S. Cl. .................... 210/195.1; 210/202; 210/208; 210/256

(56) References Cited

U.S. PATENT DOCUMENTS 3,350,302 A  10/1967  Demeter et al.

*Primary Examiner*—Chester T. Barry

(57) ABSTRACT

In a method of treating an untreated flow of liquid charged with particles and/or colloids, the flow is caused to flow in a coagulation zone that is kept turbulent and in which the flow is mixed with a coagulant. The untreated flow and a granular material which is insoluble in and more dense than the flow are caused to flow in an intermediate zone in which the granular material is maintained in suspension. The flow with substantially all of the added granular material and the colloids or particles aggregated therein is caused to flow in a sedimentation zone in which a clarified effluent is separated from sluge consisting of the granular material and the aggregated particles or colloids. The sedimentation zone has an undivided flow cross section with no separator plates and the effluent is caused to flow therein at an average settling speed of at least 15 m/h.

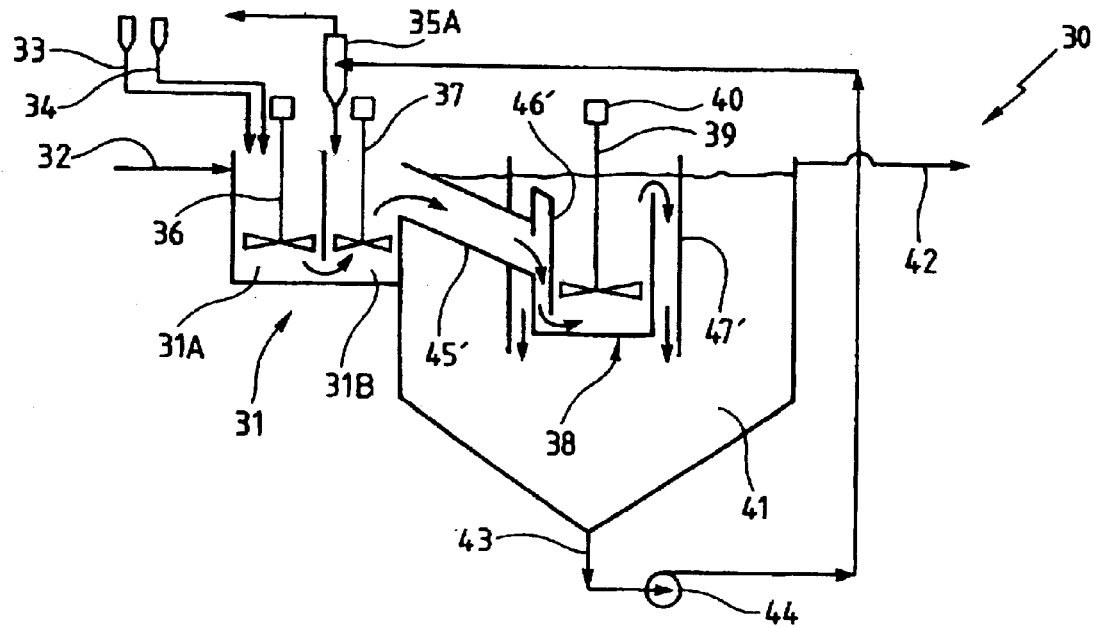

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–12 is confirmed.

\* \* \* \* \*